US008923758B2

(12) United States Patent
Stuebing et al.

(10) Patent No.: US 8,923,758 B2
(45) Date of Patent: Dec. 30, 2014

(54) TRANSMITTING DEVICE, RECEIVING DEVICE, COMMUNICATION SYSTEM, AND METHOD FOR OPERATING A TRANSMITTING DEVICE AND A RECEIVING DEVICE

(75) Inventors: Hagen Stuebing, Buedingen (DE); Sorin Alexander Huss, Heidelberg (DE)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 13/240,506

(22) Filed: Sep. 22, 2011

(65) Prior Publication Data

US 2012/0077430 A1 Mar. 29, 2012

(30) Foreign Application Priority Data

Sep. 24, 2010 (DE) ......................... 10 2010 046 469

(51) Int. Cl.

*H04B 7/24* (2006.01)
*H01Q 3/26* (2006.01)
*H01Q 1/32* (2006.01)
*G08G 1/16* (2006.01)

(52) U.S. Cl.

CPC ............ *G08G 1/161* (2013.01); *H01Q 3/2605* (2013.01); *H01Q 1/32* (2013.01); *H01Q 3/26* (2013.01)
USPC ............................................................ 455/39

(58) Field of Classification Search

CPC ................................ G08G 1/161; H01Q 1/32
USPC ........................................................... 455/39
See application file for complete search history.

(56) References Cited

U.S. PATENT DOCUMENTS

| | | | |
|---|---|---|---|
| 7,181,614 | B1 | 2/2007 | Gehrmann et al. |
| 2002/0181439 | A1 | 12/2002 | Orihashi et al. |
| 2005/0037733 | A1 | 2/2005 | Coleman et al. |
| 2005/0059388 | A1 | 3/2005 | Haines et al. |

(Continued)

FOREIGN PATENT DOCUMENTS

| | | | |
|---|---|---|---|
| DE | 102009011276 | A1 | 9/2010 |
| EP | 1102430 | A1 | 5/2001 |
| EP | 1233547 | A1 | 8/2002 |

OTHER PUBLICATIONS

UK IP Office, British Search Report for Application No. 1116186.6, dated Jan. 20, 2012.

Li, Z., et al. “Secret Communication via Multi-antenna Transmission,” IEEE 41st Annual Conference on Information Sciences and Systems, Mar. 14-16, 2007, pp. 905-910.

Stuebing, H., et al. “Enhanced Security and Privacy in C2X Communication by Radiation Pattern Control,” IEEE Vehicular Technology Conference, May 16-19, 2010, pp. 1-5.

(Continued)

*Primary Examiner* — David Bilodeau

(74) *Attorney, Agent, or Firm* — Ingrassia Fisher & Lorenz P.C.

(57) ABSTRACT

A transmitting device is provided for a communication system, which has at least one transmitting antenna, the at least one transmitting antenna being implemented to generate an emission field by emitting electromagnetic waves in an emission region. In addition, the transmitting device has a first ascertainment device, which is implemented to ascertain whether at least one receiving device for receiving the emitted electromagnetic waves, which forms a non-trustworthy receiver, is situated inside the emission region. In addition, the transmitting device has a first adaptation device, which is implemented to adapt an emission field of the at least one transmitting antenna, if at least one receiving device, which forms a non-trustworthy receiver, is ascertained inside the emission region, in such a manner that a field strength of the electromagnetic waves is reduced at the location of the at least one receiving device.

15 Claims, 11 Drawing Sheets

(56) References Cited

U.S. PATENT DOCUMENTS

| | | | | |
|---|---|---|---|---|
| 2008/0042878 | A1* | 2/2008 | Heng | 340/936 |
| 2010/0131751 | A1 | 5/2010 | Reznik et al. | |
| 2011/0151779 | A1* | 6/2011 | Bongfeldt et al. | 455/39 |
| 2012/0191271 | A1* | 7/2012 | Stuebing | 701/2 |

OTHER PUBLICATIONS

German Patent Office, German Search Report for Application No. 102010046469.4, dated Sep. 6, 2011.

* cited by examiner

TRANSMITTING DEVICE, RECEIVING DEVICE, COMMUNICATION SYSTEM, AND METHOD FOR OPERATING A TRANSMITTING DEVICE AND A RECEIVING DEVICE

CROSS-REFERENCE TO RELATED APPLICATION

This application claims priority to German Patent Application No. 102010046469.4, filed Sep. 24, 2010, which is incorporated herein by reference in its entirety.

TECHNICAL FIELD

The technical field generally relates to a transmitting device, receiving device, communication system, and method for operating a transmitting device and a receiving device

BACKGROUND

The application relates to a transmitting device for a communication system, a receiving device for a communication system, a communication system, a motor vehicle having a communication system, a method for operating a transmitting device of a communication system, a method for operating a receiving device of a communication system, a computer program product, and a computer-readable medium.

A communication system of a vehicle in street traffic is known from DE 10 2009 011 276 A1. The communication system has a communication module for data exchange of various message types with adjacent vehicles in street traffic or with roadside electronic infrastructure apparatuses. Furthermore, an input unit for steering movements of the vehicle and an antenna system having multi-antenna elements for wireless data exchange are provided. A control apparatus adapts radiation beams of the antenna system to the message types and/or the steering movements of the vehicle. For this purpose, the control unit has a phase shifter for phase adaptation of the individual antenna elements, a spacing adaptation apparatus of the antenna elements, an antenna selection apparatus of the antenna elements, and an antenna power adaptation apparatus of the antenna elements.

At least one object of the application is to specify a transmitting device for a communication system, a receiving device for a communication system, a communication system, and a motor vehicle having a communication system, which allows a further increase of the safety or a further increase of the privacy during a wireless communication. Furthermore, it is at least one object of the application to specify a method for operating a transmitting device of a communication system, a method for operating a receiving device of a communication system, a computer program product, and a computer-readable medium, which correspondingly also allow a further increase of the safety or a further increase of the privacy during a wireless communication. In addition, other objects, desirable features and characteristics will become apparent from the subsequent summary and detailed description, and the appended claims, taken in conjunction with the accompanying drawings and this background.

SUMMARY

According to an embodiment, a transmitting device for a communication system has at least one transmitting antenna, the at least one transmitting antenna being implemented to generate an emission field by emitting electromagnetic waves in an emission region. In addition, the transmitting device has a first ascertainment device, which is implemented to ascertain whether at least one receiving device for receiving the emitted electromagnetic waves, which forms a non-trustworthy receiver, is situated within the emission region. In addition, the transmitting device has a first adaptation device, which is implemented to adapt the emission field of the at least one transmitting antenna, if at least one receiving device, which forms a non-trustworthy receiver, is ascertained within the emission region, in such a manner that a field strength of the electromagnetic waves is reduced at the location of the at least one receiving device. Therefore, after the adaptation of the emission field, the receiving device is located outside an adapted emission region.

According to a further embodiment, a receiving device for a communication system has at least one receiving antenna, the at least one receiving antenna being implemented to receive electromagnetic waves which are from transmitters located inside a reception region. In addition, the receiving device has a second ascertainment device, which is implemented to ascertain whether at least one transmitting device for transmitting electromagnetic waves is provided, which forms a non-trustworthy transmitter. In addition, the receiving device has a second adaptation device, which is implemented to adapt a receiving characteristic of the receiving device, if at least one transmitting device which forms a non-trustworthy transmitter is ascertained inside the reception region, in such a manner that a sensitivity for the electromagnetic waves transmitted by the at least one transmitting device is reduced. The at least one transmitting device is therefore located outside an adapted reception region after the adaptation of the reception field.

Here and hereafter, an emission region is understood as the region in the surroundings of the transmitting device, in which the emitted electromagnetic waves are receivable or resolvable, i.e., the region in which a signal level of the electromagnetic waves is above a predetermined threshold value. A reception region is understood here and hereafter as an area of the surroundings of the receiving device in which electromagnetic waves received by means of the at least one receiving antenna may be amplified or damped in the receiving device.

A non-trustworthy receiver is understood here and hereafter as a receiving device, whose degree of trustworthiness is classified as low, i.e., below a threshold value, on the basis of predetermined criteria. Correspondingly, a non-trustworthy transmitter is understood as a transmitting device whose degree of trustworthiness is classified as low on the basis of predetermined criteria. A non-trustworthy receiver is therefore a receiving device in which reception of the electromagnetic waves emitted by the at least one transmitting antenna is to cease because of safety criteria. Correspondingly, a non-trustworthy transmitter is a transmitting device in which reception of electromagnetic waves emitted thereby by the at least one receiving antenna is to cease.

The transmitting device according to the application allows, through the provision of the first ascertainment device and the first adaptation device implemented as described above, a further increase of the safety or a further increase of the privacy during a wireless communication, in that a non-trustworthy receiver can be ascertained and the emission region can be adapted in such a manner that the ascertained non-trustworthy receiver is located outside the adapted emission region. Through the corresponding adaptation of the emission region, the receiving device which forms a non-trustworthy receiver is prevented from further reception of the electromagnetic waves emitted by the at least one transmitting antenna, which typically contain signals in the form of messages.

The receiving device according to the application also similarly allows, through the provision of the second ascertainment device and the second adaptation device implemented as described above, a further increase of the safety or a further increase of the privacy during a wireless communication. Through the ascertainment of a non-trustworthy transmitter and the adaptation of the reception field of the at least one receiving antenna in such a manner that the non-trustworthy transmitter is located outside the adapted reception region, the at least one receiving antenna is protected from further reception of the electromagnetic waves emitted by the non-trustworthy transmitter. The non-trustworthy transmitter is therefore advantageously prevented from communicating with the receiving device.

In addition, both the mentioned transmitting device and also the mentioned receiving device advantageously allow an increase of the capacity of a transmitting or receiving channel, in that through targeted propagation of electromagnetic waves, which typically contain signals in the form of messages, the corresponding channel is only occupied in specific regions and therefore a multiple usage of the channel is made possible, whereby the throughput can be increased.

In addition, the application relates to a communication system which has at least one above-described transmitting device and/or at least one above-described receiving device. The communication system according to the application has the advantages already mentioned in connection with the transmitting device or the receiving device of the application, which are not listed once again here to avoid repetitions. A communication system is presumed hereafter, which has both at least one above-described transmitting device and also at least one above-described receiving device. The at least one transmitting antenna and the at least one receiving antenna can be provided as antenna elements separate from one another in the communication system. This advantageously allows a parallel or simultaneous transmission and reception of electromagnetic waves.

In a further embodiment, the at least one transmitting antenna and the at least one receiving antenna are formed by a common antenna element. This has the advantage that the number of required components for the communication system, in particular for the case of sequential transmission or reception, can be reduced.

The communication system is preferably implemented as a vehicle-to-vehicle communication system and/or as a vehicle-to-infrastructure communication system. The mentioned communication systems are suitable to a particularly high degree, since in these systems the transmitted signals typically already contain position data of the respective transmitting or receiving device and therefore the ascertainment as to whether a non-trustworthy transmitter or receiver is situated inside the reception or emission region can be performed in a particularly simple manner.

In a further embodiment, the first adaptation device is implemented to adapt the emission field of the at least one transmitting antenna by means of adaptation of a transmission power of the at least one transmitting antenna. This advantageously already allows a simple adaptation of the emission or reception field in communication systems having only one transmitting antenna or only one receiving antenna.

In further embodiments, in which the communication system has an antenna system having multiple antenna elements, i.e., having multiple transmitting antennas and/or having multiple receiving antennas, the first adaptation device and/or the second adaptation device can additionally be implemented to adapt the emission field or the reception field by means of a phase shifter for phase adaptation of the individual antenna elements and/or a spacing adaptation apparatus of the individual antenna elements and/or an antenna selection apparatus of the individual antenna elements. The emission field or the reception field can thus be adapted to the respective situation to a further increased extent.

The first ascertainment device can additionally be implemented to ascertain a degree of the deficient trustworthiness of the at least one receiving device, which forms a non-trustworthy receiver. Additionally or alternatively, the second ascertainment device can additionally be implemented to ascertain a degree of the deficient trustworthiness of the at least one transmitting device, which forms a non-trustworthy transmitter. This advantageously allows a classification of the non-trustworthy receiver or the non-trustworthy transmitter, an adaptation of the emission field or an adaptation of the reception field preferably additionally being able to be performed as a function of the ascertained degree of the deficient trustworthiness.

In a further embodiment, the communication system is implemented to transmit various message types by means of the at least one transmitting device. The communication system additionally has a classification device, which is implemented to classify the various message types. The first adaptation device is implemented to adapt the emission field of the at least one transmitting antenna as a function of a classification of a message to be transmitted. This has the advantage that the emission field can be adapted to the requirements of various message types during the communication. Messages can thus be transmitted only to the receiver which is relevant for the message. This in turn advantageously allows an increase of the channel capacity and of the safety and privacy, in that the number of possible non-trustworthy receivers is reduced further.

The message to be transmitted is preferably selected from the group composed of a generally valid message type, a regionally valid message type, and a message type to be transmitted to precisely one receiver. The last-mentioned message type is also referred to as a so-called "unicast". A generally valid message type, which is also referred to as a so-called "broadcast," is understood here and hereafter as a message type which is directed to an unspecified receiver circle. A regionally valid message type, which is also referred to as a so-called "geocast", is understood here and hereafter as a message type in which the circle of receivers is limited to those receivers for which a regional special feature is relevant.

The application additionally relates to a motor vehicle which has a communication system according to one of the mentioned embodiments. The motor vehicle is particularly a passenger automobile or a truck. The motor vehicle according to the application has the advantages already mentioned in connection with the transmitting device or receiving device according to the application, which will not be listed once again here to avoid repetitions.

Furthermore, the application relates to a method for operating a transmitting device of a communication system, the transmitting device having at least one transmitting antenna, which is implemented to generate an emission field by emitting electromagnetic waves in an emission region. The method has the following steps. An ascertainment is performed as to whether at least one receiving device for receiving the emitted electromagnetic waves, which forms a non-trustworthy receiver, is situated inside the emission region of the at least one transmitting antenna. If at least one receiving device, which forms a non-trustworthy receiver, is ascertained within the emission region, an adaptation of the emission field of the at least one transmitting antenna is performed in such a manner that a field strength of the electromagnetic waves is reduced at the location of the at least one receiving device. The at least one receiving device is therefore located outside an adapted emission region after the adaptation of the emission field.

The application additionally relates to a method for operating a receiving device of a communication system, the receiving device having at least one receiving antenna, which is implemented to receive electromagnetic waves which are emitted by transmitters which are located inside a reception region. The method has the following steps. An ascertainment is performed as to whether at least one transmitting device for transmitting electromagnetic waves is provided, which forms a non-trustworthy transmitter. If at least one transmitting device, which forms a non-trustworthy transmitter, is ascertained, an adaptation of a receiving characteristic of the receiving device is performed in such a manner that a sensitivity is reduced for the electromagnetic waves transmitted by the at least one transmitting device. The at least one transmitting device is therefore located outside an adapted reception region after the adaptation of the reception field.

The method for operating the transmitting device and the method for operating the receiving device according to the application have the advantages already mentioned in connection with the transmitting device or the receiving device according to the application, which will not be listed once again here to avoid repetitions.

In an embodiment, the ascertainment as to whether at least one transmitting device for transmitting electromagnetic waves, which forms a non-trustworthy transmitter, is situated inside the reception region is performed by means of analyzing a content of a message transmitted by the at least one transmitting device and/or by a further transmitting device and/or by means of an analysis of a transmission frequency of the electromagnetic waves transmitted by the at least one transmitting device. The analysis of the content of a message transmitted by the at least one transmitting device can particularly include an analysis of a digital signature, typically checking a validity of the signature, and/or checking transmitted position and/or velocity data of the transmitting device for plausibility. The analysis of a transmission frequency can particularly include the comparison of the transmission frequency to a predetermined threshold value. The mentioned embodiments allow a particularly reliable ascertainment of a non-trustworthy transmitter, in particular in the case of vehicle-to-vehicle and/or vehicle-to-infrastructure communication systems, since the mentioned message contents are typically already provided or a maximum permissible transmission frequency is typically known therein.

Furthermore, the application relates to a computer program product, which, when it is executed on a computer unit of a communication system, instructs the computer unit to execute the following steps. The computer unit is instructed to ascertain whether at least one receiving device for receiving electromagnetic waves emitted by the at least one transmitting antenna, which forms a non-trustworthy receiver, is situated within an emission region of at least one transmitting antenna of the communication system. If at least one receiving device which forms a non-trustworthy receiver is ascertained within the emission region, the computer unit is instructed to adapt an emission field of the at least one transmitting antenna in such a manner that a field strength of the electromagnetic waves is reduced at the location of the at least one receiving device. The at least one receiving device is therefore located outside an adapted emission region after the adaptation of the emission field.

Furthermore, the application relates to a computer program which, when it is executed on a computer unit of a communication system, instructs the computer unit to execute the following mentioned steps. The receiving device of the communication system has at least one receiving antenna, implemented to receive electromagnetic waves which are emitted by transmitters which are located inside a reception region. The computer unit is instructed to ascertain whether at least one transmitting device for transmitting electromagnetic waves is provided, which forms a non-trustworthy transmitter. If at least one transmitting device which forms a non-trustworthy transmitter is ascertained, the computer unit is instructed to adapt a receiving characteristic of the receiving device in such a manner that a sensitivity is reduced for the electromagnetic waves transmitted by the at least one transmitting device. The at least one transmitting device is therefore located outside an adapted reception region after the adaptation of the reception field.

Furthermore, the application relates to a computer-readable medium, on which a computer program product according to at least one of the two mentioned embodiments is stored. The computer program products and the computer-readable medium according to the application have the advantages already mentioned in connection with the transmitting device or the receiving device according to the application, which are not listed once again here to avoid repetitions.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding or summary or the following detailed description.

Figure 1A:
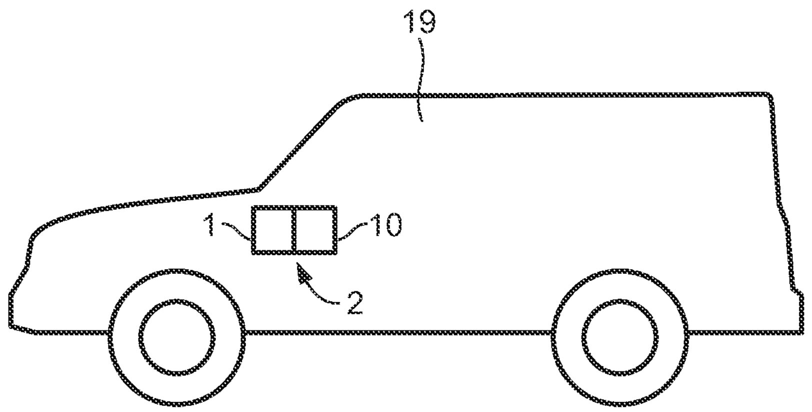
FIG. 1A shows a motor vehicle according to an embodiment of the application.
Figure 1B:
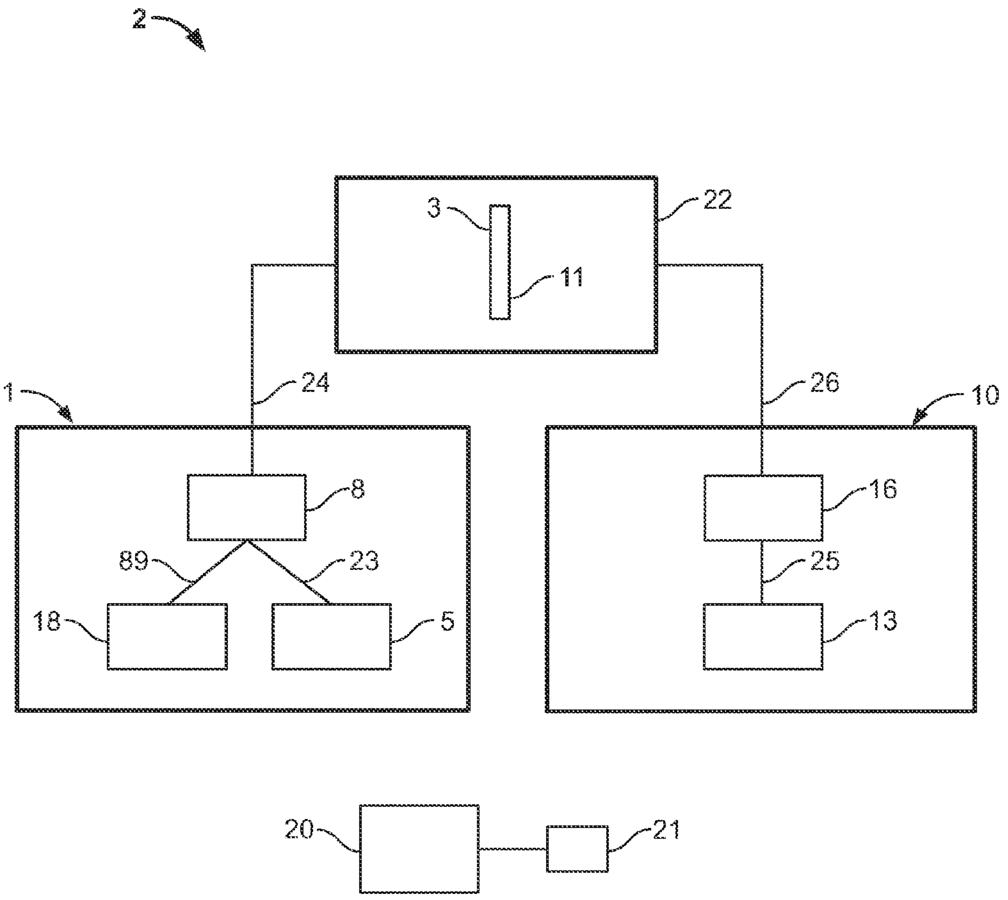
FIG. 1B shows components of the motor vehicle according to FIG. 1A.

FIG. 1A shows a motor vehicle 19 according to an embodiment of the application. The motor vehicle 19 is a passenger automobile in the embodiment shown. The motor vehicle 19 has a communication system 2 having a transmitting device 1 and a receiving device 10. Further details are explained in greater detail in connection with the following figure. For this purpose, FIG. 1B shows components of the motor vehicle according to FIG. 1A. Components having the same functions as in FIG. 1A are identified by the same reference numerals.

The communication system 2 of the motor vehicle (not shown in greater detail in FIG. 1B) includes, in addition to the transmitting device 1 and the receiving device 10, a common antenna system 22 for the transmitting device 1 and the receiving device 10. The transmitting device 1 of the communication system 2 has a transmitting antenna 3, which is implemented to emit electromagnetic waves within an emission region. In addition, the transmitting device 1 has a first ascertainment device 5, which is implemented to ascertain whether at least one receiving device for receiving the emitted electromagnetic waves, which forms a non-trustworthy receiver, is situated inside the emission region. In the embodiment shown, the communication system 2 is implemented to transmit various message types by means of the transmitting device 1 and additionally has a classification device 18, which is implemented to classify the various message types.

Furthermore, the transmitting device 1 has a first adaptation device 8, which is implemented to adapt an emission field of the at least one transmitting antenna 3. In the embodiment shown, the first adaptation device 8 is implemented to adapt the emission field of the transmitting antenna 3 as a function of a classification of a message to be transmitted, the message to be transmitted being selected from the group composed of a generally valid message type, a regionally valid message type, and a message type to be transmitted to precisely one receiver.

Furthermore, if at least one receiving device which forms a non-trustworthy receiver is ascertained within the emission region, an adaptation of the emission field is performed in such a manner that the at least one receiving device is located outside an adapted emission region. The first adaptation device 8 is connected for this purpose via a signal line 23 to the first ascertainment device 5, via a signal line 89 to the classification device 18, and via a control line 24 to the antenna system 22, which includes the transmitting antenna 3.

In the embodiment shown, the first adaptation device 8 is implemented to adapt the emission field of the transmitting antenna 3 by means of adaptation of a transmission power of the transmitting antenna 3. For this purpose, the communication system 2 has a power regulator (not shown in greater detail) for adapting the transmission power of the transmitting antenna 3.

The receiving device 10 of the communication system 2 has a receiving antenna 11, which is implemented to receive signals which are transmitted by means of electromagnetic waves within a reception region. In addition, the receiving device 10 has a second ascertainment device 13, which is implemented to ascertain whether at least one transmitting device for transmitting electromagnetic waves, which forms a non-trustworthy transmitter, is situated within the reception region. In addition, the receiving device 10 has a second adaptation device 16, which is implemented to adapt a reception field of the receiving antenna 11. If at least one transmitting device, which includes a non-trustworthy transmitter, is ascertained within the reception region, the adaptation is performed in such a manner that the at least one transmitting device is located outside an adapted reception region. The second adaptation device 16 is connected for this purpose via a signal line 25 to the second ascertainment device 13 and via a control line 26 to the antenna system 22, which includes the receiving antenna 11. The second adaptation device 16 is implemented to adapt the reception field of the receiving antenna 11 by means of adaptation of a sensitivity of the receiving antenna 11. The embodiment shown therefore allows a simple adaptation of the emission field or the reception field, only the transmitting antenna 3 or the receiving antenna 11 being required for this purpose.

In the embodiment shown, the transmitting antenna 3 and the receiving antenna 11 are formed by a common antenna element. The number of required components of the communication system 2 can thus advantageously be decreased. Furthermore, in the embodiment shown, the motor vehicle (not shown in greater detail) has a computer unit 20 and a computer-readable medium 21, a computer program product being stored on the computer-readable medium 21 which, when it is executed on the computer unit 20, instructs the computer unit 20 to execute the steps of the method according to the application by means of the elements mentioned therein. For this purpose, the computer unit 20 is directly or indirectly connected to the mentioned components in a way not shown in greater detail.

Figure 2:
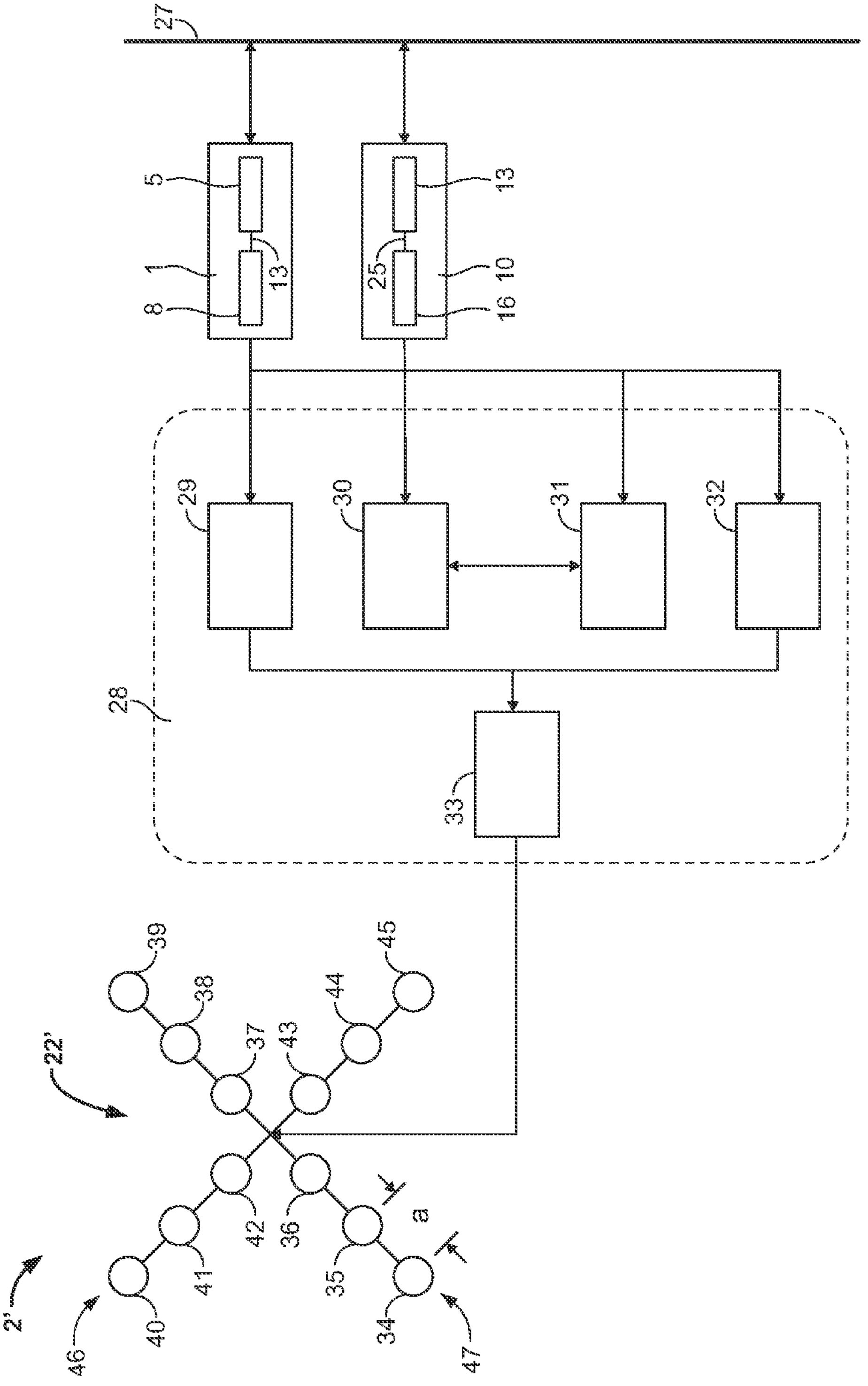
FIG. 2 shows a schematic block diagram of a communication system according to a second embodiment of the application.

FIG. 2 shows a schematic block diagram of a communication system 2' of a motor vehicle (not shown in greater detail) according to a first embodiment of the application. Components having the same functions as in the preceding figures are identified by the same reference numerals and are not explained in greater detail hereafter The motor vehicle has a CAN bus 27, to which the transmitting device 1 and the receiving device 10 of the communication system 2' are connected. In addition, in the embodiment shown, the transmitting device 1 and the receiving device 10 are connected to a control device 28 for adapting the emission field or the reception field of antenna elements 34 to 45. The antenna elements 34 to 45 each represent transmitting and receiving antennas in the embodiment shown.

The control device 28 has a phase shifter 29, which forms phase differences between the input currents for the individual antenna elements 34 to 45. In addition, the control device 28 has a spacing adaptation apparatus 30, which calculates and adjusts the spacing a between the antenna elements 34 to 45. Furthermore, an antenna selection apparatus 31 is situated in the control device 28, which selects and activates one of the perpendicularly intersecting linear antenna arrangements 46 and 47 and deactivates the remaining antenna elements, on the one hand, and activates antenna elements within one of the antenna arrangements 46 and 47, which have the matching spacing for generating the emission or reception regions, on the other hand. Furthermore, the control device 28 has a power regulator 32, which adapts the emission fields of the antenna elements 34 to 45 by varying the input currents into the selected and active antenna elements. The phase shifter 29 and the power regulator 32 act on a feed current network 33, which sets the feed currents for the individual active antenna elements. The communication system 2' according to the embodiment shown allows a precise and differentiated adaptation of the emission or reception field of the antenna elements 34 to 45 and thus an adaptation of the emission or reception region which takes the respective situation into consideration to an increased extent.

Figure 3:
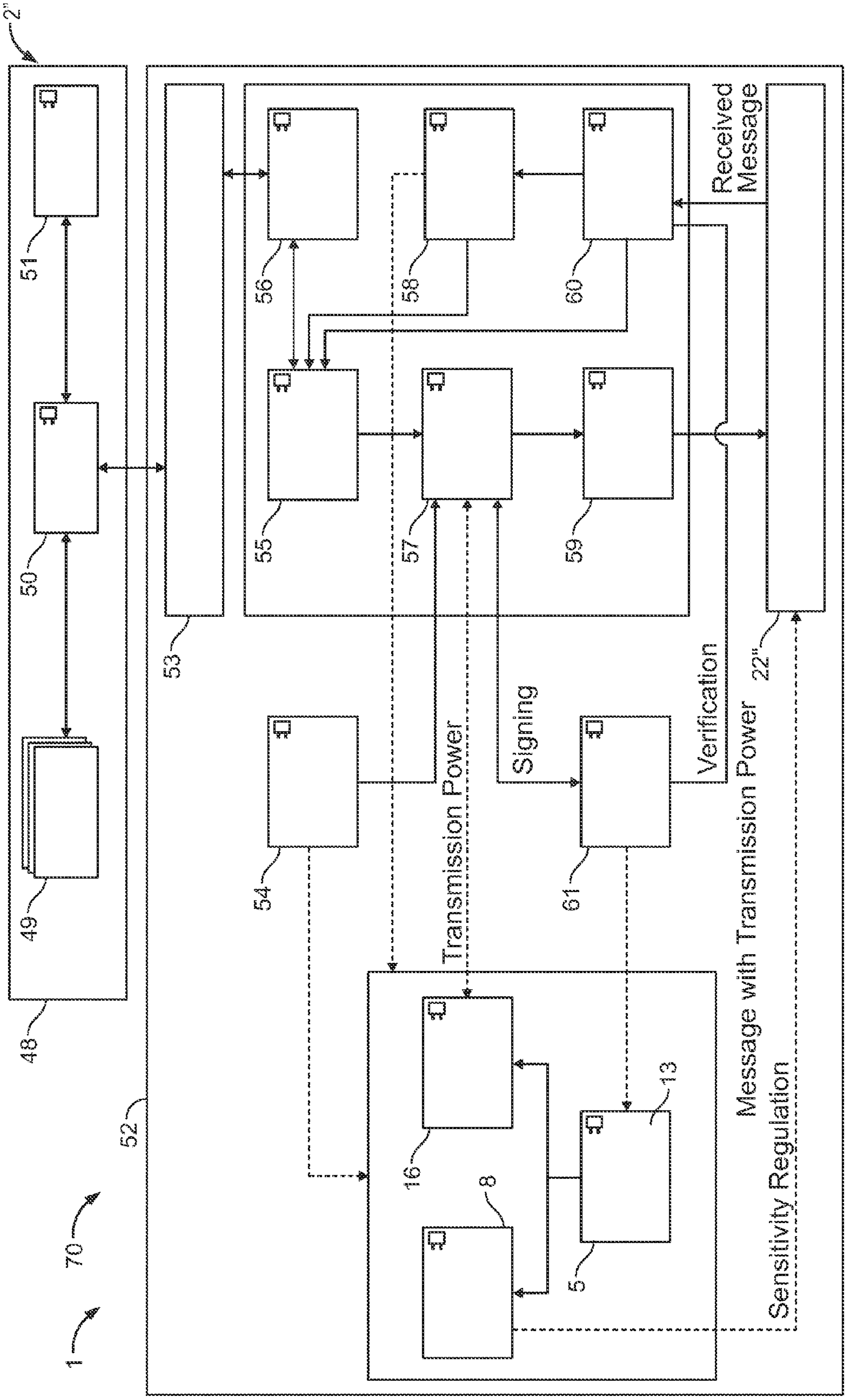
FIG. 3 shows a schematic block diagram of a communication system according to a second embodiment of the application.

FIG. 3 shows a schematic block diagram of a communication system 2" of a motor vehicle (not shown in greater detail here) according to a second embodiment of the application. Components having the same functions as in the preceding figures are identified by the same reference numerals and are not explained in greater detail hereafter. The communication system 2" is implemented in the embodiment shown as a vehicle-to-vehicle and vehicle-to-infrastructure communication system. Corresponding communication systems are also referred to as so-called car-to-car (C2C) or car-to-infrastructure (C2I) communication systems, or C2X communication systems in short, or as vehicle-to-vehicle (V2V) or vehicle-to-roadside (V2R) communication systems.

In the embodiment shown, the communication system 2" has two units in the form of an application module 48 and a communication module 52. The handling of all communication-related parts from access up to network and facility layer is the task of the communication module 52, which is also referred to as the CCU (communication control unit). The application module 48, which is also referred to as the AU (application unit), includes all C2X applications for vehicle or roadway safety and traffic efficiency. The components relevant for the communication system according to the application are shown in FIG. 3.

The application module 48 is implemented for executing two successive applications, event detection and event notification. The event detection or event ascertainment can include information or signals of all vehicle-intrinsic sensors and also received vehicle-to-vehicle or vehicle-to-infrastructure messages. After processing and aggregation, the application incorporates all relevant information into a DENM (decentralized environmental notification message). DENMs are event-specific messages and include multiple fields for relaying within the network and for event classification. In addition to DENMs, in the embodiment shown, the communication system 2" contains a further message type, which is generated by the application layer. This message type is referred to as a PVD message (probe vehicle data message) and contains data sets of values which a motor vehicle ascertains during travel, for example, geographic traces together with local temperatures. These messages or this message type are transmitted via unicast to a roadside electronic infrastructure apparatus, which is also referred to as an RSU (roadside unit), and subsequently relayed to downstream apparatuses.

In the embodiment shown, the application module 48 has ITS applications 49 (intelligent transport system) and an AU communication client 50. The AU communication client 50, which is also referred to as an AU communication client, represents an interface for all incoming and outgoing messages to the communication module 52. Before relaying the incoming messages to the applications, mobility data included in the message are verified by a mobility verification unit 51. The communication module 52 contains a so-called ITS facility 53, whose main task is the generation of so-called CAMs (cooperative awareness messages). CAMs are periodically transmitted messages which include the mobility data of the specific motor vehicle, for example, position, velocity, and travel direction. If these messages or this message type were observed or received by a possible aggressor, the data contained therein could be used for tracking the motor vehicle over long distances. This message type is therefore very relevant in particular with respect to privacy. The communication system 2" advantageously allows an increase of the privacy, as explained in greater detail hereafter.

For the position-based transmission, a neighborhood table 58, which is also referred to as a location table, is managed and continuously updated after receiving new messages. A dispatch unit 57, which is also referred to as a C2X dispatcher, receives the mobility data of the specific vehicle via a data provision unit 54, which is also referred to as a vehicle data provider. The data provision unit 54 allows the access to a CAN bus and a position ascertainment module, for example, a GPS module, of the motor vehicle. The dispatch unit 57 composes the message having network header and transfers the entire packet to a cryptography unit 61. A signature is generated and the corresponding certificate is supplemented, before the message is transmitted via the access layer, i.e., the physical layer in the form of the antenna system 22". Furthermore, the transmitting device 1 of the communication system 2" has a relay unit 55 and a dispatch unit 59, which is also referred to as packet queuing.

Incoming messages are handled by a reception processing unit 60, which is also referred to as an ingress handler. After receiving the message, the correctness of the signature and the validity of the certificate are verified by means of the cryptography unit 61. The neighborhood table 58 is updated and the relay type is ascertained. Furthermore, the communication module 52 includes a transport layer 56 in the embodiment shown.

In the embodiment shown, the antenna system 22" includes two transmitting and receiving antennas (not shown in greater detail), which have a transmission or reception frequency of 5.9 GHz. Each of these antennas generates an essentially semicircular emission field in the front or rear direction of the motor vehicle. A packet-by-packet power control or power regulation is possible for each of the antennas in the embodiment shown in steps of 0.5 dB fineness in a range from approximately 0 dBm to 20 dBm.

For a corresponding adaptation of the emission or reception fields of the two transmitting and receiving antennas as described above, the communication system 2" includes the first ascertainment device 5 and the second ascertainment device 13, which form a common component in the embodiment shown. Furthermore, the communication system 2" includes the first adaptation device 8 and the second adaptation device 16 for this purpose. The position of the specific motor vehicle relative to adjacent motor vehicles is ascertained via an interface to the data provision unit 54 and the position of relevant receivers is determined via an interface to the neighborhood table 58. The degree of trustworthiness of established receivers is ascertained via a further interface to the cryptography unit 61. In addition, a further interface to the dispatch unit 57 is provided. A precise evaluation of the present C2X situation is thus made possible overall.

With the goal of increasing the safety and privacy, these components dynamically determine the suitable emission or reception fields for transmitting or receiving messages in such a manner that a non-trustworthy receiver is located outside an adapted emission region or a non-trustworthy transmitter is located outside an adapted reception region. Further details are explained in greater detail in connection with the following figure. In the embodiment shown, the first ascertainment device 8 is additionally implemented for ascertaining a degree of the deficient trustworthiness of the at least one receiving device, which forms a non-trustworthy receiver. In addition, the second ascertainment device 13 is implemented to ascertain a degree of the deficient trustworthiness of the at least one transmitting device, which forms a non-trustworthy transmitter. This is performed in the embodiment shown by analyzing a content of a message transmitted by the non-trustworthy transmitter or the non-trustworthy receiver, in particular by means of analysis of a signature and/or by means of mobility data included in the message, for plausibility. If multiple non-correctly signed messages are received by a special transmitter, this transmitter is classified as an aggressor having a low threat level in the embodiment shown. In contrast, if a transmission frequency of the electromagnetic signals or messages transmitted by a transmitter exceeds a predetermined threshold value and therefore this transmitter overfills the channel with messages, this transmitter is classified as an aggressor having high hazard potential.

Figure 4:
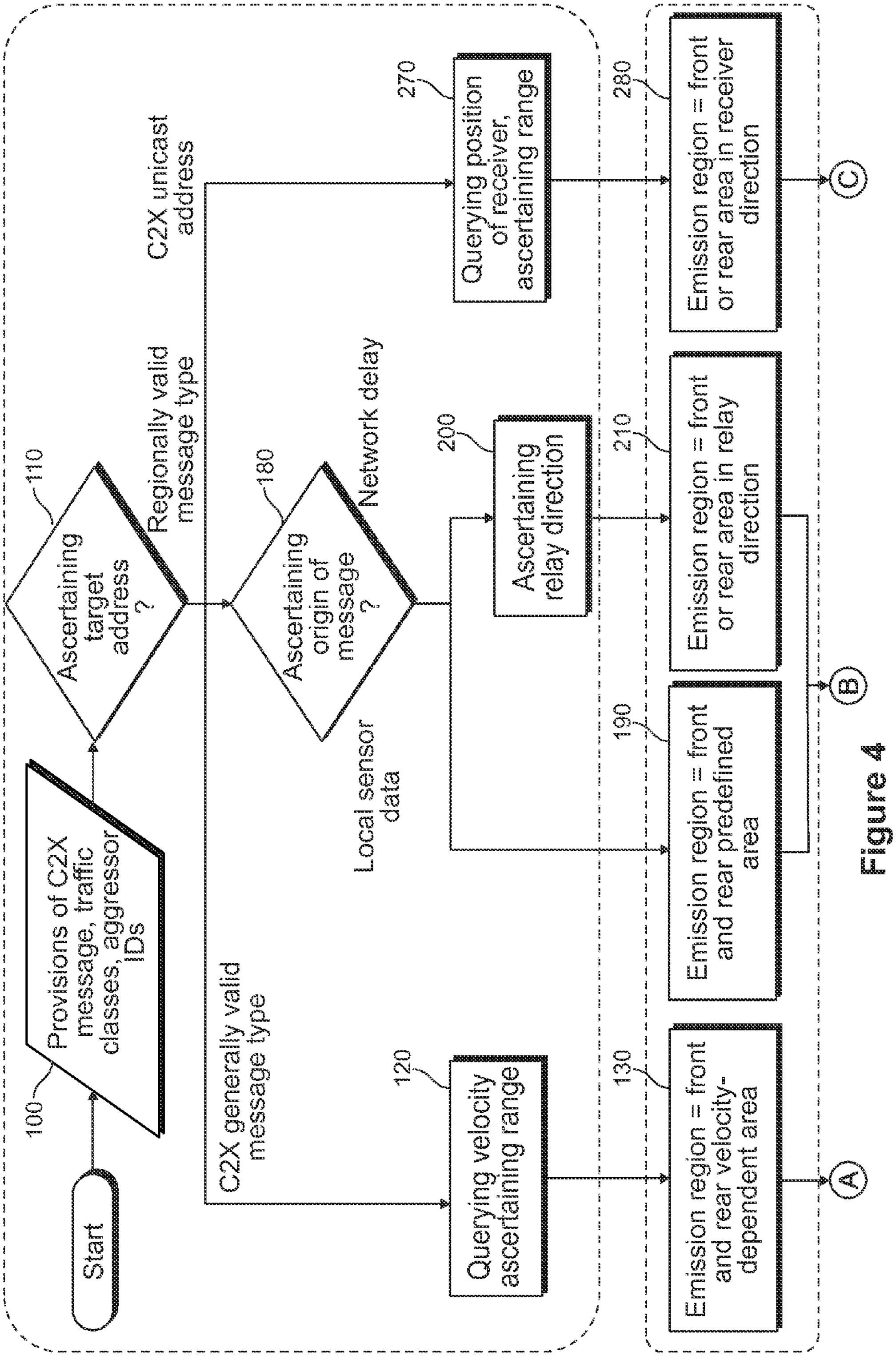
FIG. 4 shows a flow chart of a method for operating a transmitting device of a communication system according to an embodiment of the application.
Figure 4:
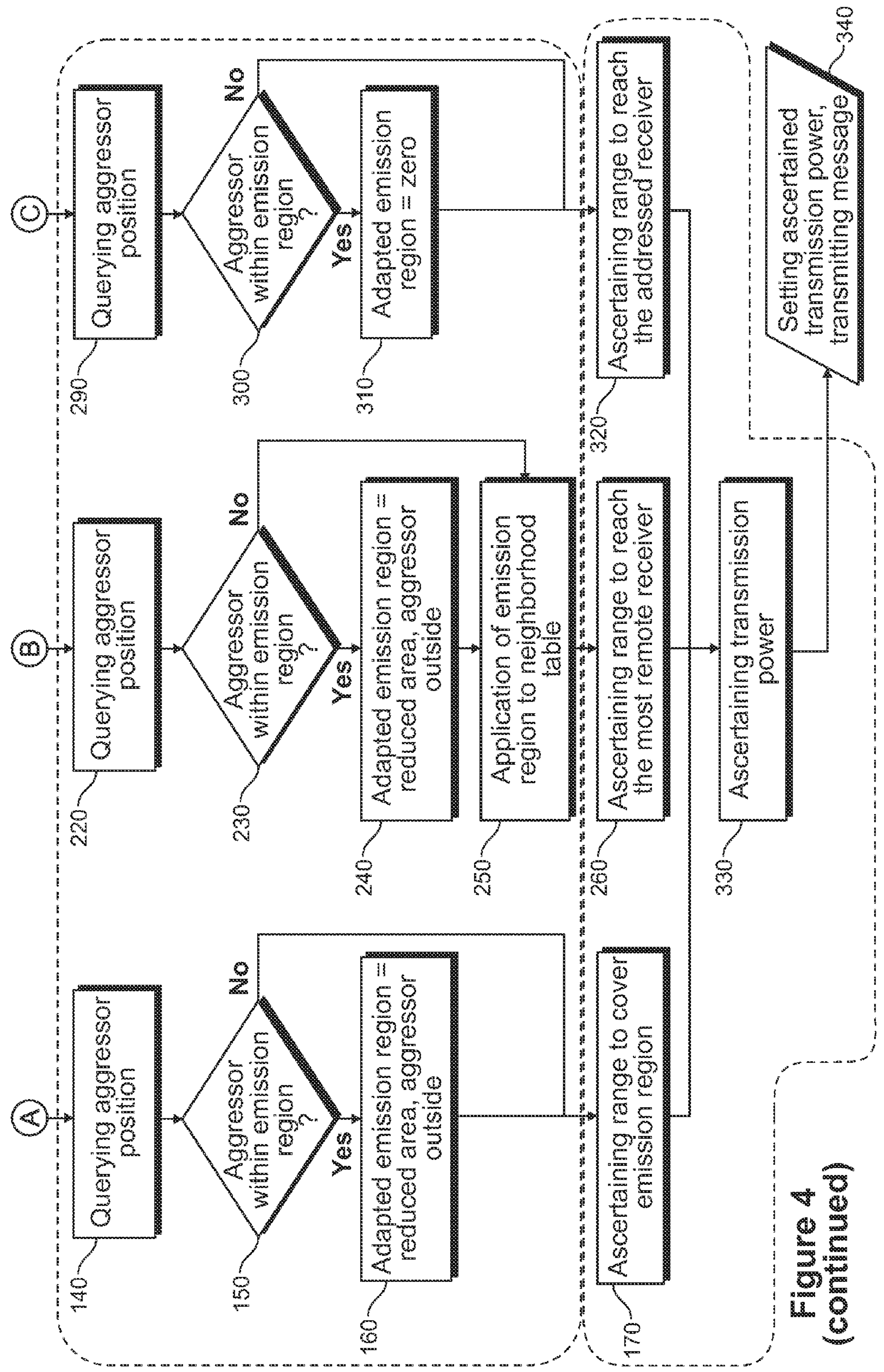

FIG. 4 shows a flow chart of a method for operating a transmitting device of a communication system according to an embodiment of the application. The communication system is implemented in the embodiment shown as a vehicle-to-vehicle or as a vehicle-to-infrastructure communication system. In a step 100, the C2X message to be transmitted, corresponding to traffic classes and aggressor IDs, is provided. In a step 110, the target address of the message to be transmitted is ascertained. The message to be transmitted is selected in the embodiment shown from the group comprising a generally valid message type, a regionally valid message type, and a message type to be transmitted to precisely one receiver.

If it is ascertained in step 110 that the message to be transmitted represents a generally valid message type, in a step 120, the instantaneous velocity of the specific vehicle is queried from a data provision unit and the range of the emission region for the message to be transmitted is ascertained therefrom. In the embodiment shown, the transmission energy or transmission power for the transmitting antenna emitting in the travel direction of the motor vehicle is directly proportional to the instantaneous velocity of the motor vehicle. For the transmitting antenna emitting in a rear area of the motor vehicle, in contrast, the transmission energy or transmission power is scaled inversely proportional to the instantaneous vehicle velocity. The relevance of generally valid message types, for example, CAMs, is thus displaced from the rear area into the front area of the transmission region at higher velocities. The establishment of the emission region as extending both in the front region and also in the rear region is shown in step 130.

In a step 140, the position of an ascertained non-trustworthy receiver, for example, an aggressor or a faulty receiving device, is queried. This is performed in the embodiment shown based on identified, unsecure IDs, which were ascertained by the first ascertainment device, the present position of the aggressor being queried from the neighborhood table. It is ascertained in a step 150 whether at least one non-trustworthy receiver is located inside the emission region. If no non-trustworthy receiver is located inside the emission region, the range which is required to cover the emission region is ascertained in a step 170. In contrast, if at least one non-trustworthy receiver is located within the emission region, in a step 160, an ascertainment of an adapted emission region is performed in such a manner that the at least one receiving device which represents a non-trustworthy receiver is located outside this adapted emission region.

Subsequently, in step 170, the range which is required to cover the adapted emission region is in turn ascertained. If it is ascertained in step 110 that the message to be transmitted is a regionally valid message type, the origin of the message to be transmitted is ascertained in a step 180. If the message to be transmitted is based on data ascertained by means of vehicle-intrinsic sensors, the emission region is established in a step 190 in such a manner that it occupies a predetermined area both in the front direction and also in the rear direction of the motor vehicle. In contrast, it is ascertained in step 180 that the message to be transmitted is a message to be relayed via the network, i.e., the message was obtained by a vehicle from the surroundings, the relay direction is ascertained in a step 200.

Based on the ascertained relay direction, the emission region is determined in a step 210 in such a manner that is oriented either in the front direction or in the rear direction of the motor vehicle. In a step 220, the position of non-trustworthy receivers is queried and it is ascertained in a step 230 whether at least one aggressor is located inside the emission region.

If no aggressor is located inside the emission region, in a step 250, the emission region is applied to the neighborhood table. The position of the receiver to which the message to be transmitted is to be transmitted is thus ascertained. In contrast, if at least one non-trustworthy receiver is located inside the emission region, the emission region is adapted in a step 240 in such a manner that the at least one receiving device, which forms a non-trustworthy receiver, is located outside the adapted emission region. In step 250, the adapted emission region is subsequently applied to the neighborhood table.

In a step 260, the range of the emission region is ascertained, the range being determined in the embodiment shown in such a manner that the most remote receiver can receive the message to be transmitted. If it is ascertained in step 110 that the message to be transmitted represents a message type to be transmitted to precisely one receiver, in a step 270, the position of the receiver is queried and a range is ascertained. In a step 280, the emission region is established in such a manner that it either points in the front direction or in the rear direction of the motor vehicle as a function of the direction of the receiver.

In a step 290, the position of an aggressor or non-trustworthy receiver is queried. Furthermore, it is ascertained in a step 300 whether at least one non-trustworthy receiver is located inside the emission region. If no aggressor is located inside the emission region, in a step 320, the range, which is required so that the receiver can receive the message, is ascertained. In contrast, if at least one receiving device, which forms a non-trustworthy receiver, is located inside the emission region, in a step 310, the emission region is adapted in such a manner that the at least one receiving device is located outside the adapted emission region. This is performed in the embodiment shown in such a manner that the adapted emission region is reduced to zero. Therefore, in step 320, the range is also ascertained as zero and the transmission of the message is ceased in this case.

In a step 330, the respective transmission power which is required to cover the emission region or the adapted emission region is ascertained. In a step 340, an adjustment of the ascertained transmission power and the transmission of the message by means of the corresponding front and/or rear transmitting antenna are performed.

Figure 5:
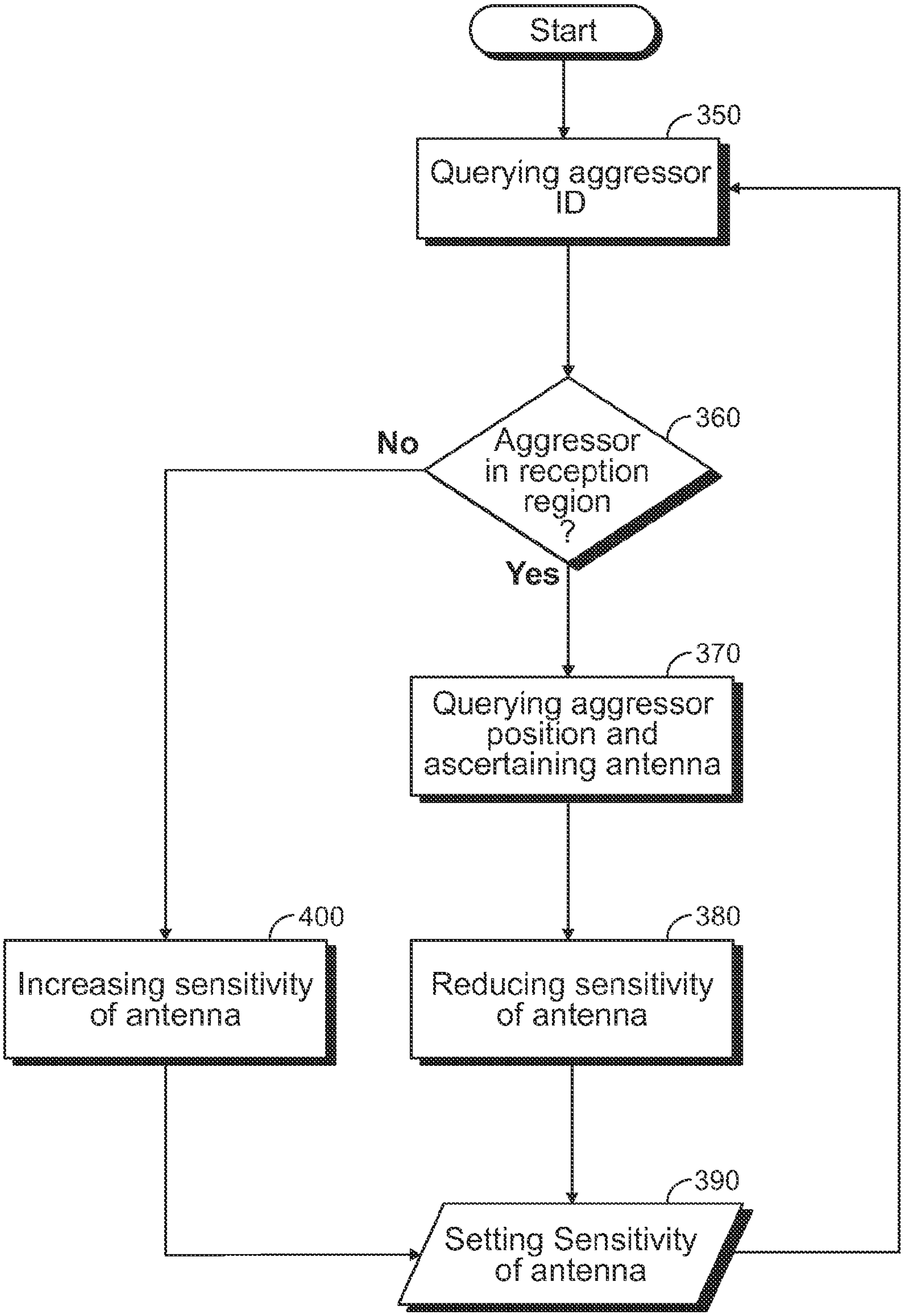
FIG. 5 shows a method for operating a receiving device of a communication system according to an embodiment of the application.

FIG. 5 shows a flow chart of a method for operating a receiving device of a communication system according to an embodiment of the application. In the embodiment shown, the communication system is a vehicle-to-vehicle or vehicle-to-infrastructure communication system.

In a step 350, a second ascertainment device of the receiving device, which is implemented as described above, is queried for aggressor IDs. In a step 360, it is ascertained whether at least one transmitting device which forms a non-trustworthy transmitter is situated inside the reception region of a receiving antenna of the receiving device. If at least one transmitting device which forms a non-trustworthy transmitter is ascertained within the reception region, in a step 370, the position of the aggressor is queried and the affected receiving antenna is determined therefrom.

In a step 380, the sensitivity of the affected receiving antenna is subsequently reduced by 0.5 dB in the embodiment shown and in a step 390, the newly ascertained value of the sensitivity is set. In contrast, if it is ascertained in step 360 that no aggressor is situated inside the reception region, in a step 400, the sensitivity of the receiving antennas is increased by 0.5 dB in the embodiment shown. In step 390, the newly determined sensitivity is in turn subsequently set.

Subsequently, steps 350, 360, and 370 to 390 or 400 and 390 are executed repeatedly. The most precise possible adaptation of the reception region can thus be performed, on the one hand, a non-trustworthy transmitter being excluded and therefore no further messages being received therefrom and, on the other hand, the adapted reception region covering the largest possible area.

Figure 6:
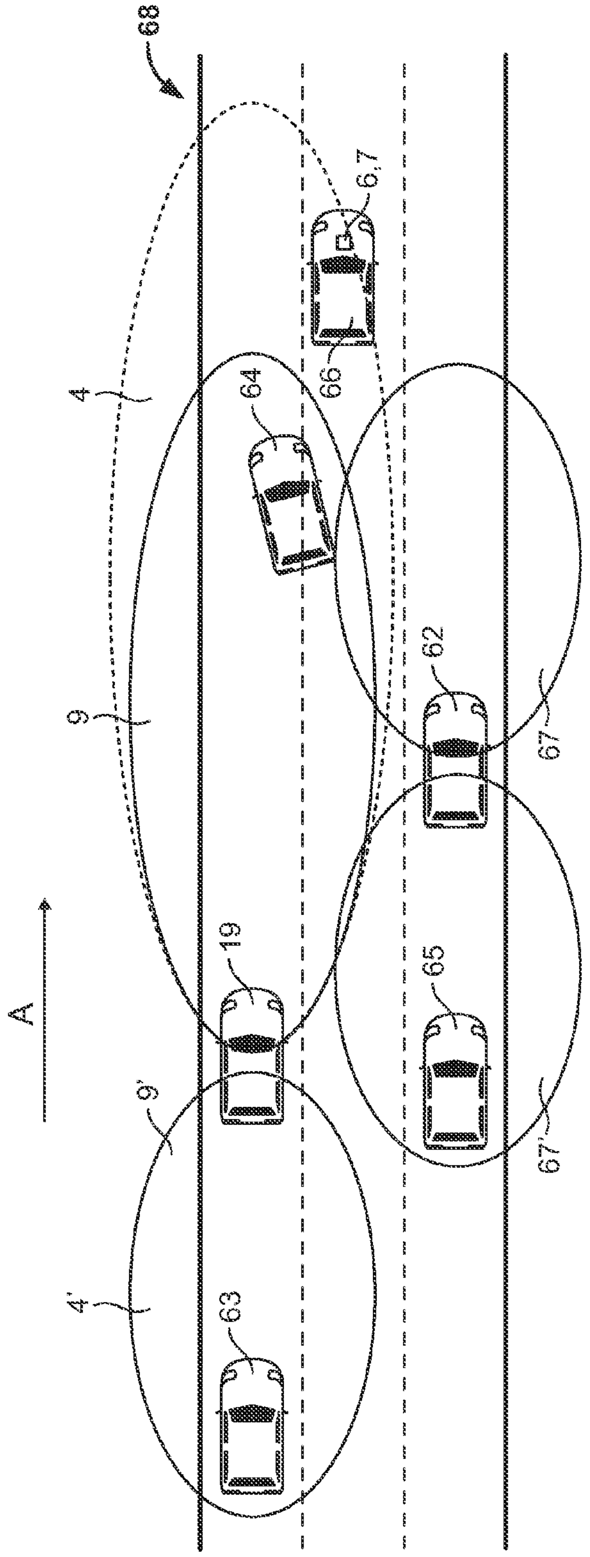
FIG. 6 shows an example of a transmission of a generally valid message type.

FIG. 6 shows an example of a transmission of a generally valid message type. Components having the same functions as in the preceding figures are identified by the same reference numerals and are not explained in greater detail hereafter. A motor vehicle 19, which has a communication system (not shown in greater detail in FIG. 6) according to the application, for example, according to FIG. 3, travels on a roadway 68 in a travel direction schematically shown by means of an arrow A. In addition, further motor vehicles 62 to 66 are located on the roadway 68, which forms a three-lane freeway in the embodiment shown.

The motor vehicle 19 transmits a message of the type CAM and therefore a generally valid message type. The transmission is performed both in a front direction and also in a rear direction of the motor vehicle 19. For this purpose, a first transmitting antenna (not shown in greater detail) has an emission region 4 and a second transmitting antenna (also not shown in greater detail) of the motor vehicle 19 has an emission region 4'. The emission energy is directly proportional to the velocity of the motor vehicle 19 in the travel direction of the motor vehicle 19, while in contrast the emission energy is indirectly proportional to the velocity of the motor vehicle 19 opposite to the travel direction.

In the embodiment shown, the motor vehicle 66 has a receiving device 6, which forms a non-trustworthy receiver 7. Accordingly, the first adaptation device (not shown in greater detail) of the motor vehicle 19 adapts an emission field of the transmitting antenna in such a manner that the receiving device 6 of the motor vehicle 66 is located outside an adapted emission region 9 or 9', only an adaptation of the front transmitting antenna being required for this purpose. The adapted emission region 9' is therefore identical to the original emission region 4'.

The motor vehicle 62 also has a communication system (not shown in greater detail) and transmits a message of the type CAM within emission regions 67 and 67'. The motor vehicle 19 has a higher instantaneous velocity than the motor vehicle 62, because of which the message is transmitted with a higher transmission energy in the travel direction.

The motor vehicle 64, which is located in front of the motor vehicle 19, changes in the illustrated traffic situation to the roadway of the motor vehicle 19 and can be informed early about the presence of the motor vehicle 19 by the message thereof transmitted within the adapted emission regions 9 or 9'. The emission regions 4, 4', 9, 9' and 67 and 67' are essentially in the form of lobes or ellipses in the embodiment shown.

Figure 7A:
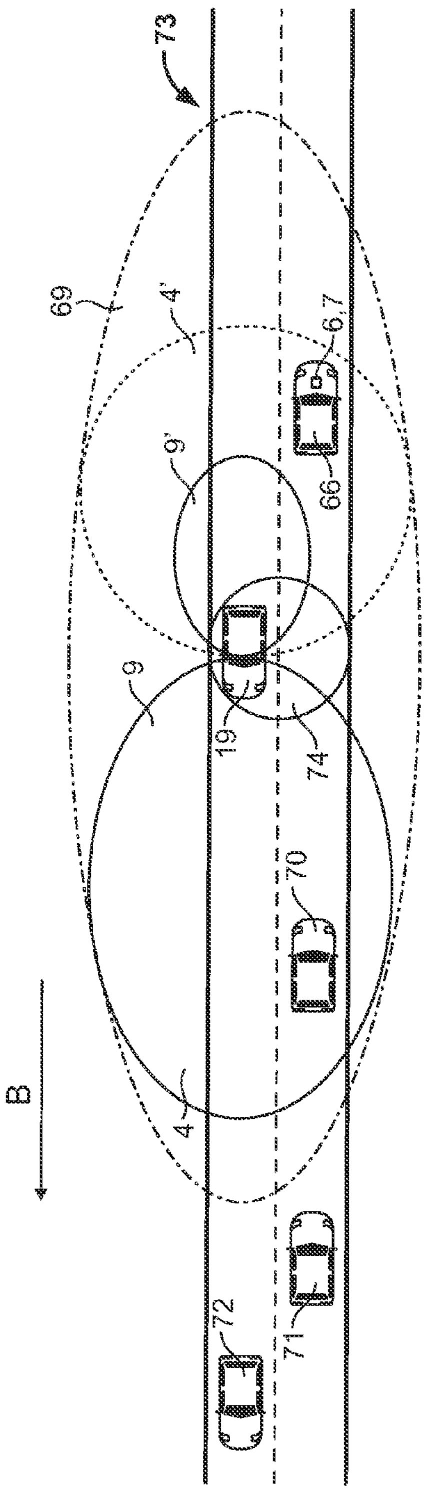
FIG. 7A and FIG. 7B show examples of a transmission of a regionally valid message type.
Figure 7B:
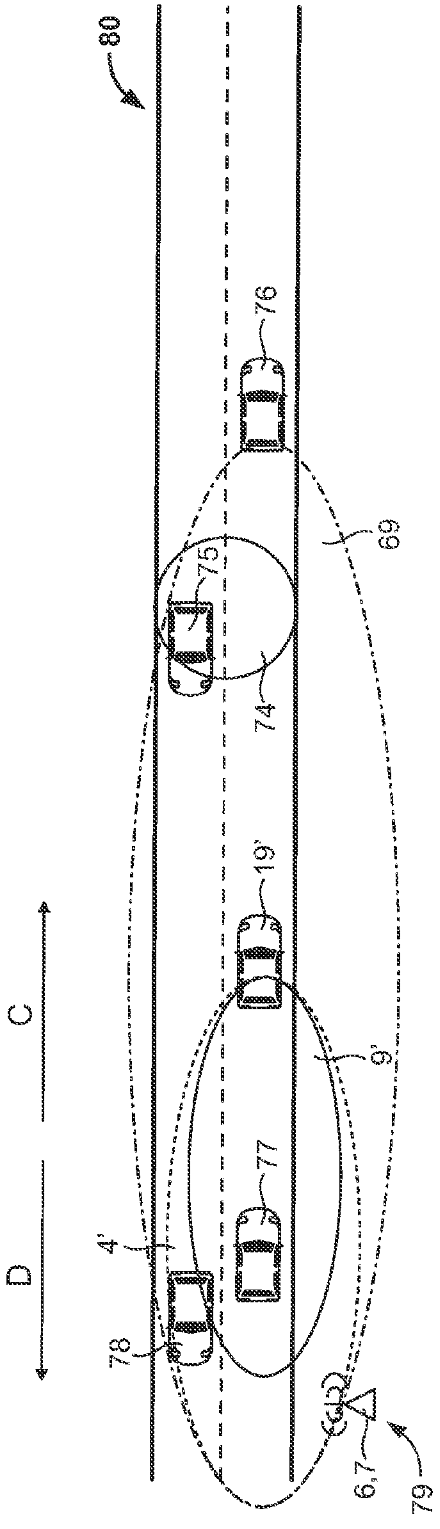

FIG. 7A and FIG. 7B show examples of a transmission of a regionally valid message type, in the embodiment shown in the form of a travel weather warning. Components having the same function as in the preceding figures are identified by the same reference numerals and are not explained in greater detail hereafter the traffic situation shown in FIG. 7A, a schematically shown area 74, in which a bad weather situation, for example, black ice, strong rain, or fog prevails, is ascertained by vehicle-intrinsic sensors of a motor vehicle 19. A corresponding warning message is transmitted by means of the transmitting antenna (not shown in greater detail) of the motor vehicle 19 to motor vehicles which are located on the roadway 73 in the surroundings of the motor vehicle 19. This is performed both in a travel direction of the motor vehicle 19, schematically shown by means of an arrow B, and also opposite to the travel direction of the motor vehicle 19.

A maximum emission region 69 which can be covered is schematically shown by means of a dot-dash line. In the embodiment shown, the communication system of the motor vehicle 19 ascertains the position of the further motor vehicles 66, 70, 71, and 72 located in the surroundings and adapts the emission regions 4 and 4' to the position of those motor vehicles which are located inside the maximum possible emission region 69 most remote from the motor vehicle 19. Furthermore, it is ascertained by the communication system of the motor vehicle 19 whether an aggressor is located inside the emission regions 4 and 4', in the embodiment shown, the motor vehicle 66 having a receiving device 6, which is classified as a non-trustworthy receiver 7. Accordingly, the first adaptation device (not shown in greater detail) of the communication system of the motor vehicle 19 reduces the emission field of the rear transmitting antenna in such a manner that the receiving device 6 is located outside an adapted emission region 9'. In contrast, the emission field of the front transmitting antenna remains unchanged, whereby an adapted emission region 9 is identical to the original emission region 4.

In FIG. 7B, a transmission of a travel weather warning is also performed by means of a communication system (not shown in greater detail) of a motor vehicle 19' traveling in a travel direction schematically shown by means of an arrow C, the motor vehicle 19' already having received this travel weather warning itself by means of a vehicle-to-vehicle message from a motor vehicle 75 and therefore merely relaying it. In the embodiment shown, the relay direction is schematically shown by means of an arrow D. The relay is provided to motor vehicles 77 and 78 which are located behind the motor vehicle 19' on a roadway 80, however, the relaying to the motor vehicle 75 and a further motor vehicle 76 ceases.

A roadside infrastructure apparatus 79 forms a receiving device 6 in the situation shown, which was ascertained as a non-trustworthy receiver 7, for example, because the infrastructure apparatus 79 has a faulty transmitting unit. An adapted emission region 9' is therefore provided in such a manner that the infrastructure apparatus 79 is located outside the adapted emission region 9', whereby the travel weather warning is only relayed to the motor vehicle 77, since the motor vehicle 78 is also located outside the adapted emission region 9'.

Figure 8A:
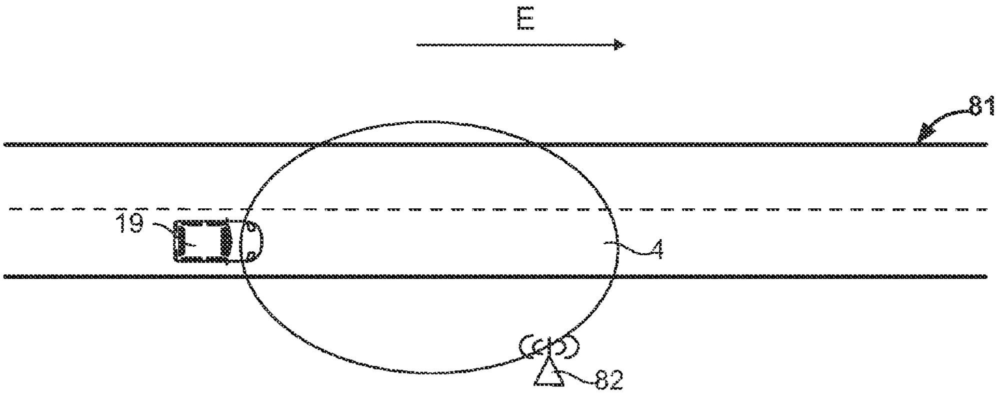
FIG. 8A and FIG. 8B show examples of a transmission of a message type to be transmitted to precisely one receiver.
Figure 8B:
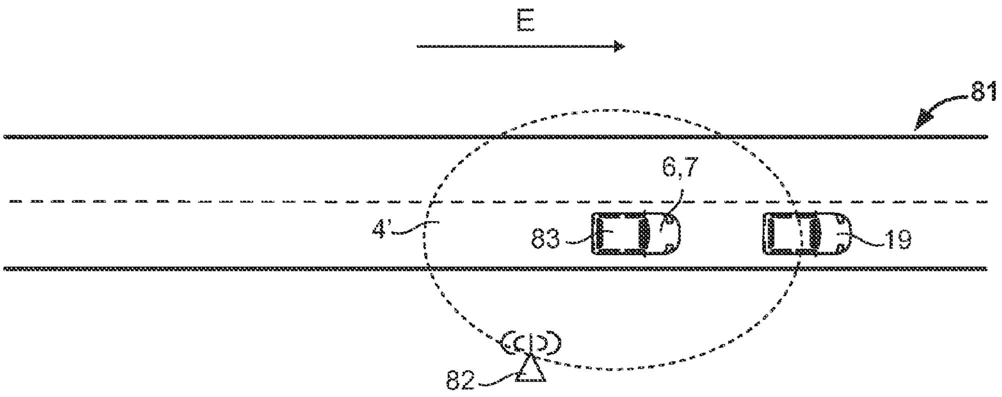

FIG. 8A and FIG. 8B show an example of a transmission of a message type to be transmitted to precisely one receiver, in the embodiment shown in the form of a transmission of a message to a roadside infrastructure apparatus 82. Components having the same functions as in the preceding figures are identified by the same reference numerals and are not explained in greater detail hereafter.

The transmission is performed by a communication system of a motor vehicle 19, which moves on a roadway 81 in a travel direction schematically shown by means of an arrow E, only a front transmitting antenna of the motor vehicle 19 transmitting the message within an emission region 4 in FIG. 8A. In FIG. 8B, the motor vehicle 19 has moved further in such a manner that a transmission of the message is solely provided by means of the rear transmitting antenna within an emission region 4'. However, a motor vehicle 83, which contains a further receiving device 6, which forms a non-trustworthy receiver 7, is located in a direct line between the motor vehicle 19 and the infrastructure apparatus 82. Therefore, in the embodiment shown, an adapted emission region is determined as zero. A transmission of the message thus ceases in the embodiment shown.

Figure 9:
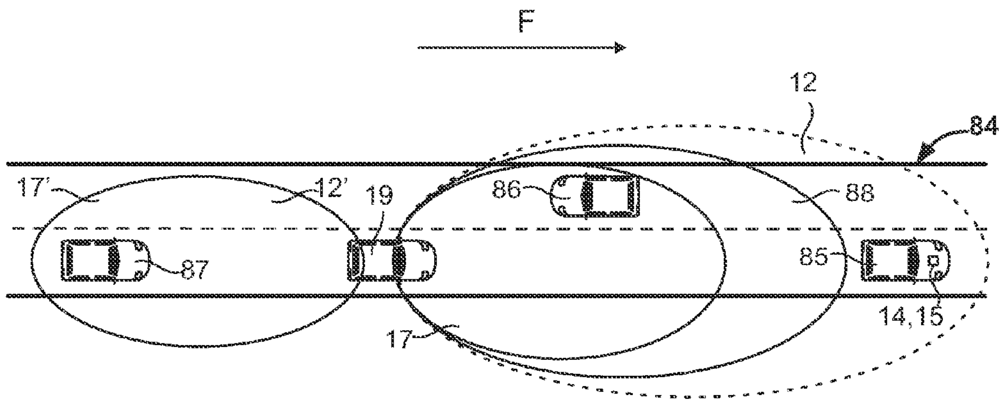
FIG. 9 shows an example of an adaptation of a reception region.

FIG. 9 shows an example of an adaptation of a reception region. Components having the same functions as in the preceding figures are identified by the same reference numerals and are not explained in greater detail. In the situation shown, a motor vehicle 19, which has a communication system (not shown in greater detail) according to the application, is located on a roadway 84 in a travel direction schematically shown by means of an arrow F. Furthermore, motor vehicles 85, 86, and 87 are located on the roadway 84.

A front receiving antenna of the motor vehicle 19 has a reception region 12 schematically shown by means of a dashed line and a rear receiving antenna of the motor vehicle 19 has a schematically shown reception region 12'. The motor vehicle 85, which includes a transmitting device 14 in the situation shown, which was classified as a non-trustworthy transmitter 15, for example, because the transmitting device 14 transmits incorrectly due to a defect, is located inside the reception region 12. Correspondingly, an adaptation of the reception field of the front receiving antenna of the motor vehicle 19 is performed in such a manner that the transmitting device 14 is located outside an adapted reception region 17. In contrast, an adaptation of the reception field of the rear receiving antenna is not necessary, whereby an adapted reception region 17' is identical to the original reception region 12'.

Furthermore, in the example shown, a further adaptation of the reception field of the front receiving antenna is performed in such a manner that a further adapted reception region 88 of the front receiving antenna covers the largest possible area. Overall, the mentioned examples therefore show motor vehicles having a communication system, in which a first adaptation device calculates the matching extension of the antenna field for each message to be transmitted. The required energy is set accordingly for each antenna. During the calculation, a different algorithm is used in each case for the various message types. A message which is transmitted via a broadcast is transmitted using a velocity-dependent field distribution. A message which provides a geographic region as the propagation is transmitted to predefined vehicles in range. A unicast message addresses precisely one receiver, whereby only the antenna in the corresponding direction is used for transmission. In addition, an adaptation of the field to possible aggressor positions is performed for all three message types. If the communication system has an antenna system having multiple transmitting antennas, the first adaptation device can additionally be implemented for adapting the emission field by means of a phase shifter for phase adaptation of the individual antenna elements and/or a spacing adaptation apparatus of the individual antenna elements and/or an antenna selection apparatus of the individual antenna elements. The emission field can thus be adapted to the respective situation to a further increased extent.

A second adaptation device continuously regulates the sensitivity of both receiving antennas. The positions of possible aggressors serve as the input variable here. If the position of one aggressor is identified, the sensitivity of the corresponding antenna is reduced until messages are no longer received by this aggressor. This can also be performed, for example, by rotating the antenna away from the receiving direction of the aggressor or by increasing a switching threshold in the receiver. The sensitivity is then increased again step-by-step.

The first or second ascertainment devices are responsible for the identification of aggressors, i.e., non-trustworthy transmitters or receivers. They have an interface to the cryptographic components, which check the integrity and authenticity of messages. If the verification of multiple messages from one transmitter fails, it is classified as non-trustworthy. Furthermore, it is checked whether a transmitter sends more messages than provided. If a specific threshold is exceeded, the transmitter is also marked as non-trustworthy, in order to thus prevent so-called jamming or denial of service attacks.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A transmitting device for a communication system, comprising:

at least one transmitting antenna configured to generate an emission field by emitting electromagnetic waves in an emission region with an emission energy that is based at least in part on a velocity of the at least one transmitting device, wherein the emission field is defined by an outer boundary;

a first ascertainment device configured to ascertain whether at least one receiving device that is configured to receive emitted electromagnetic waves, which forms a non-trustworthy receiver, is situated inside the emission region; and a first adaptation device configured to adapt the emission field of the at least one transmitting antenna, if the at least one receiving device, which forms the non-trustworthy receiver, is ascertained inside the emission region, in such a manner that a field strength of the electromagnetic waves is reduced at a location of the at least one receiving device, and wherein the first adaptation device is configured to adapt the emission field by reducing a size of the emission field and a length of the outer boundary, wherein the at least one transmitting antenna includes a front transmitting vehicle antenna and a rear transmitting vehicle antenna, and wherein the front transmitting vehicle antenna is configured to transmit the emission field in a direction towards a front of a vehicle and the rear transmitting vehicle antenna is configured to transmit a rear transmission field in direction towards a rear of the vehicle, and wherein a front emission energy of the front transmitting vehicle antenna is directly proportional to the velocity of the transmitting device.

2. A communication system, comprising:

at least one transmitting device, the at least one transmitting device comprising:

at least one transmitting antenna configured to generate an emission field by emitting electromagnetic waves in an emission region with an emission energy that is based at least in part on a velocity of the at least one transmitting antenna, wherein the emission field is defined by an outer boundary;

a first ascertainment device configured to ascertain whether at least one receiving device that is configured to receive emitted electromagnetic waves, which forms a non-trustworthy receiver, is situated inside the emission region; and a first adaptation device configured to adapt the emission field of the at least one transmitting antenna, if the at least one receiving device, which forms the non-trustworthy receiver, is ascertained inside the emission region, in such a manner that a field strength of the electromagnetic waves is reduced at a location of the at least one receiving device, and wherein the first adaptation device is configured to adapt the emission field by reducing a size of the emission field and a length of the outer boundary, wherein the at least one transmitting antenna includes a front transmitting vehicle antenna and a rear transmitting vehicle antenna, and wherein the front transmitting vehicle antenna is configured to transmit the emission field in a direction towards a front of a vehicle and the rear transmitting vehicle antenna is configured to transmit a rear transmission field in a direction towards a rear of the vehicle, and wherein a front emission energy of the front transmitting vehicle antenna is directly proportional to the velocity of the transmitting device; and the at least one receiving device comprising:

at least one receiving antenna configured to receive the electromagnetic waves, which are emitted by transmitters that are located inside a reception region, a second ascertainment device configured to ascertain whether the at least one transmitting device configured to transmit the electromagnetic waves is provided that forms a non-trustworthy transmitter; and a second adaptation device configured to adapt a receiving characteristic of a receiving device if the at least one transmitting device, which forms the non-trustworthy transmitter, is ascertained in such a second manner that a sensitivity is reduced for the electromagnetic waves transmitted by the at least one transmitting device.

3. The communication system according to claim 2, wherein the communication system is a vehicle-to-vehicle communication system.

4. The communication system according to claim 2, wherein the communication system is a vehicle-to-infrastructure communication system.

5. The communication system according to claim 2, wherein the first adaptation device is configured to adapt the emission field of the at least one transmitting antenna with an adaptation of a transmission power of the at least one transmitting antenna.

6. The communication system according to claim 2, wherein the first ascertainment device is further configured to ascertain a degree of deficient trustworthiness of the at least one receiving device, which forms the non-trustworthy receiver.

7. The communication system according to claim 2 wherein the second ascertainment device is further configured to ascertain a degree of deficient trustworthiness of the at least one transmitting device, which forms the non-trustworthy transmitter.

8. The communication system according to claim 2, wherein the communication system is configured to transmit various message types with the at least one transmitting device, and the communication system is further comprises a classification device configured to classify the various message types, and the first adaptation device is further configured to adapt the emission field of the at least one transmitting antenna as a function of a classification of a message to be transmitted.

9. The communication system according to claim 8, wherein the message to be transmitted is selected from a group consisting of a generally valid message type, a regionally valid message type, or a message type to be transmitted to precisely one receiver.

10. A method for operating a transmitting device of a communication system, the transmitting device including at least one transmitting antenna that is configured to generate an emission field by emitting electromagnetic waves in an emission region with an emission energy that is based at least in part on a velocity of the at least one transmitting antenna, wherein the emission field is defined by an outer boundary and the at least one transmitting antenna includes a front transmitting antenna and a rear transmitting antenna, and wherein the front transmitting antenna is configured to transmit the emission field in a direction towards a front of a vehicle and the rear transmitting antenna is configured to transmit a rear transmission field in a direction towards a rear of the vehicle, the method comprising:

ascertaining whether at least one receiving device for receiving emitted electromagnetic waves, which forms a non-trustworthy receiver, is situated inside the emission region of the at least one transmitting antenna; and adapting the emission field of the at least one transmitting antenna in such a manner that a field strength of the electromagnetic waves is reduced at a location of the at least one receiving device if the at least one receiving device, which forms the non-trustworthy receiver, is ascertained inside the emission region, and wherein adapting the emission field includes reducing a size of the emission field and a length of the outer boundary, and wherein adapting the emission field includes adapting a front emission energy of the front transmitting antenna in a directly proportional relationship to the velocity of the transmitting device.

11. A computer readable medium embodying a computer program product, said computer program product comprising:

a communication program, the communication program configured to:

ascertain whether at least one receiving device for receiving electromagnetic waves emitted by at least one transmitting antenna with an emission energy that is based at least in part on a velocity of the at least one transmitting antenna, which forms a non-trustworthy receiver, is situated inside an emission region of at least one transmitting antenna of a communication system; and adapting an emission field of the at least one transmitting antenna in such a manner that a field strength of the electromagnetic waves is reduced at a location of the at least one receiving device if the at least one receiving device, which forms the non-trustworthy receiver, is ascertained within an emission region, wherein the emission field is defined by an outer boundary, and wherein adapting the emission field includes reducing a size of the emission field and a length of the outer boundary, and wherein adapting the emission field includes adapting a front emission energy of a front transmitting antenna of the at least one transmitting antenna in a directly proportional relationship to the velocity of the front transmitting antenna.

12. The transmitting device of claim 1, wherein the first adaptation device is configured to adapt the emission field by reducing a transmission power of the transmitting antenna.

13. A transmitting device for a communication system, comprising:

at least one transmitting antenna configured to generate an emission field by emitting electromagnetic waves in an emission region with an emission energy that is based at least in part on a velocity of the at least one transmitting device, wherein the emission field is defined by an outer boundary;

a first ascertainment device configured to ascertain whether at least one receiving device that is configured to receive emitted electromagnetic waves, which forms a non-trustworthy receiver, is situated inside the emission region; and a first adaptation device configured to adapt the emission field of the at least one transmitting antenna, if the at least one receiving device, which forms the non-trustworthy receiver, is ascertained inside the emission region, in such a manner that a field strength of the electromagnetic waves is reduced at a location of the at least one receiving device, and wherein the first adaptation device is configured to adapt the emission field by reducing a size of the emission field and a length of the outer boundary, wherein the at least one transmitting antenna includes a front transmitting vehicle antenna and a rear transmitting vehicle antenna, and wherein the front transmitting vehicle antenna is configured to transmit the emission field in a direction towards a front of a vehicle and the rear transmitting vehicle antenna is configured to transmit a rear transmission field in direction towards a rear of the vehicle, and wherein a rear emission energy of the rear transmitting vehicle antenna is indirectly proportional to the velocity of the transmitting device.

14. A method for operating a transmitting device of a communication system, the transmitting device including at least one transmitting antenna that is configured to generate an emission field by emitting electromagnetic waves in an emission region with an emission energy that is based at least in part on a velocity of the at least one transmitting antenna, wherein the emission field is defined by an outer boundary and the at least one transmitting antenna includes a front transmitting antenna and a rear transmitting antenna, and wherein the front transmitting antenna is configured to transmit the emission field in a direction towards a front of a vehicle and the rear transmitting antenna is configured to transmit a rear transmission field in a direction towards a rear of the vehicle, the method comprising:

ascertaining whether at least one receiving device for receiving emitted electromagnetic waves, which forms a non-trustworthy receiver, is situated inside the emission region of the at least one transmitting antenna; and adapting the emission field of the at least one transmitting antenna in such a manner that a field strength of the electromagnetic waves is reduced at a location of the at least one receiving device if the at least one receiving device, which forms the non-trustworthy receiver, is ascertained inside the emission region, and wherein adapting the emission field includes reducing a size of the emission field and a length of the outer boundary, and wherein a rear emission energy of the rear transmitting antenna is indirectly proportional to the velocity of the rear transmitting antenna.

15. A computer readable medium embodying a computer program product, said computer program product comprising:

a communication program, the communication program configured to:

ascertain whether at least one receiving device for receiving electromagnetic waves emitted by at least one transmitting antenna with an emission energy that is based at least in part on a velocity of the at least one transmitting antenna, which forms a non-trustworthy receiver, is situated inside an emission region of at least one transmitting antenna of a communication system; and adapt an emission field of the at least one transmitting antenna in such a manner that a field strength of the electromagnetic waves is reduced at a location of the at least one receiving device if the at least one receiving device, which forms the non-trustworthy receiver, is ascertained within an emission region, wherein the emission field is defined by an outer boundary, and wherein adapting the emission field includes reducing a size of the emission field and a length of the outer boundary, and wherein adapting the emission field includes adapting a rear emission energy of a rear transmitting antenna of the at least one transmitting antenna in an indirectly proportional relationship to the velocity of the rear transmitting antenna.

* * * * *